(12) United States Patent
Mikhailov et al.

(10) Patent No.: US 9,951,613 B2
(45) Date of Patent: Apr. 24, 2018

(54) METHOD FOR QUANTITATIVE ANALYSIS OF A DISTRIBUTION OF SOLID PARTICLES OF A SUSPENSION INVADED IN A POROUS MEDIUM DURING FILTRATION

(71) Applicant: SCHLUMBERGER TECHNOLOGY CORPORATION, Sugar Land, TX (US)

(72) Inventors: Dmitry Nikolaevich Mikhailov, Moscow (RU); Nikita Llyich Ryzhikov, Moscow (RU); Alexander Alexandrovich Burukhin, Moscow (RU); Vladislav Vladimirovich Zhvik, Moscow (RU); Anastasiya Viktorovna Gabova, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/179,610

(22) Filed: Jun. 10, 2016

(65) Prior Publication Data

US 2017/0356290 A1 Dec. 14, 2017

(30) Foreign Application Priority Data

Jun. 11, 2015 (RU) .................................. 2015122312

(51) Int. Cl.
*G06K 9/00* (2006.01)
*E21B 49/00* (2006.01)
(Continued)

(52) U.S. Cl.
CPC ............. *E21B 49/005* (2013.01); *G01V 8/02* (2013.01); *G06T 7/0004* (2013.01); *G06T 2207/10024* (2013.01); *G06T 2207/30181* (2013.01)

(58) Field of Classification Search
CPC ........ A61B 17/12022; A61B 17/12113; A61B 17/12154; A61B 2017/1205;
(Continued)

(56) References Cited

U.S. PATENT DOCUMENTS

| 4,722,095 A | 1/1988 | Muegge et al. |
| 5,027,379 A | 6/1991 | Hunt et al. |

(Continued)

FOREIGN PATENT DOCUMENTS

| CN | 102410974 A | 4/2012 |
| WO | WO2012165991 A1 | 12/2012 |

OTHER PUBLICATIONS

Bedrikovetsky, P. et al., "Characterisation of Deep Bed Filtration System from Laboratory Pressure Drop Measurements", Journal of Petroleum Science and Engineering, 2001, 32(2-4), pp. 167-177.

(Continued)

*Primary Examiner* — Tom Y Lu (57) ABSTRACT

Solid particles are colored with a cationic dye and at least three calibration standards having different known mass concentrations of the colored particles are prepared. A digital analysis of the images of the calibration standards is carried out based on an additive RGB color model and intensity distribution profiles of red, green and blue colors are obtained for each calibration standard. A single norm function is selected to characterize quantitatively changes in the red, green and blue colors in all calibration standards. A single calibration curve is obtained by comparing values of the selected norm function for each calibration standard with a known mass concentration of the colored particles in this calibration standard. A suspension of the colored solid particles is injected through a porous medium sample and the sample is split into two parts along a suspension flow direction. A digital analysis of an image of the split of the porous medium sample is carried out based on the additive (Continued)

RGB color model and a two-dimensional intensity distribution of red, green and blue colors in the sample split is obtained. Reference intensities of red, green and blue colors are determined and based on the obtained two-dimensional intensity distribution of red, green and blue colors in the obtained image of the sample split, using the reference intensities of red, green and blue colors, the selected norm function and the obtained calibration curve a two-dimensional distribution of the mass concentration of the colored suspension solid particles is determined.

26 Claims, 5 Drawing Sheets (51) Int. Cl.
  *G01V 8/02* (2006.01)
  *G06T 7/00* (2017.01)
(58) Field of Classification Search
  CPC ......... A61B 2017/12054; E21B 49/005; E21B 49/02; G01N 33/241; G01V 8/02; G06T 7/0004; G06T 2207/30181; G06T 2207/10024
  USPC ...................................................... 382/109
  See application file for complete search history.

(56) References Cited

U.S. PATENT DOCUMENTS

| | | | | |
|---|---|---|---|---|
| 5,253,719 | A | 10/1993 | Blauch et al. | |
| 7,099,811 | B2* | 8/2006 | Ding | E21B 37/00 703/10 |
| 8,548,782 | B2* | 10/2013 | Hsu | G01V 11/00 166/250.01 |
| 8,718,993 | B2* | 5/2014 | Klie | G06F 17/50 703/10 |
| 8,914,268 | B2* | 12/2014 | Dale | E21B 43/00 703/10 |
| 9,085,957 | B2* | 7/2015 | Wallace | E21B 43/00 |
| 9,187,984 | B2* | 11/2015 | Usadi | G06F 17/5018 |
| 9,228,940 | B2* | 1/2016 | Pelletier | G01N 21/47 |
| 9,689,802 | B2* | 6/2017 | Caseres | G01N 21/3554 |
| 2010/0054574 | A1 | 3/2010 | Marcelpoil et al. | |
| 2012/0134559 | A1 | 5/2012 | Suzuki et al. | |
| 2013/0010918 | A1 | 1/2013 | Mikhailov et al. | |
| 2013/0010919 | A1 | 1/2013 | Mikhailov et al. | |
| 2014/0076549 | A1* | 3/2014 | Pelletier | E21B 47/0005 166/250.14 |
| 2015/0039275 | A1 | 5/2015 | Mikhailov et al. | |

OTHER PUBLICATIONS

Theuveny, B. et al., Integrated Approach to Simulation of Near-Wellbore and Wellbore Cleanup, SPE 166509, 2013, pp. 1-28.
Herzig, J. P. et al., "Flow of Suspensions Through Porous Media—Application to Deep Filtration", Industrial and Engineering Chemistry, 1970, 62(5), pp. 8-35.
Civan F. "Reservoir Formation Damage: Fundamentals, Modeling, Assessment and Mitigation", Second Edition, Gulf Publishing Company, 2007, p. 796.
Bai, R. et al., "Effect of Deposition in Deep-Bed Filtration: Determination and Search of Rate Parameters", Journal of Colloid and Interface Science. 2000, 231, pp. 299-311.
Wennberg, K. E. et al., "Determination of the Filtration Coefficient and the Transition Time for Water Injection Wells", SPE 38181, 1987. pp. 353-364.
Sharma, M. M. et al., "Injectivity Decline in Water Injection Wells: An Offshore Gulf of Mexico Case Study", SPE 38180, 1997, pp. 341-351.
Gruesbeck, C. et al., "Entrainment and Deposition of Fine Particles in Porous Media", SPE 8430, 1982, pp. 847-856.
Ives, K. J. et al., "Kinetics of Filtration of Dilute Suspensions", Chemical Engineering Science, 1965, 20(11), pp. 965-973.
Jiao, D. et al., "Formation Damage Due to Static and Dynamic Filtration of Water-Based Muds", SPE 23823, 1992, pp. 491-501.
Longeron, D.G. et al., "Experimental Approach to Characterize Drilling Mud Invasion, Formation Damage and Cleanup Efficiency in Horizontal Wells with Openhole Completions", SPE 58737, 2000, pp. 1-13.
Nadeev, A. et al., "Visualization of Clay and Frozen Substances Inside Porous Rocks Using X-Ray Micro-Computed Tomography", Microscopy and Analysis, 2013, 27(2), pp. S8-S11.

* cited by examiner

METHOD FOR QUANTITATIVE ANALYSIS OF A DISTRIBUTION OF SOLID PARTICLES OF A SUSPENSION INVADED IN A POROUS MEDIUM DURING FILTRATION

CROSS-REFERENCE TO RELATED APPLICATION

This application claims priority to Russian Application No. 2015122312 filed Jun. 11, 2015, which is incorporated herein by reference in its entirety.

TECHNICAL FIELD

The invention relates to methods for analyzing samples of porous materials, in particular, it can be used for quantitative study of a deterioration of properties in a near-wellbore area of oil/gas-containing formations resulting from invasion thereinto of drilling fluid components.

BACKGROUND

The invasion of contaminant solid particles (for example, in suspension) into a porous medium occurs in many technical applications: purification of liquids in the chemical industry, filtration of groundwater, injection of water to a reservoir in order to maintain the reservoir pressure, and drilling oil and gas producing wells. The determination of a change in the properties of a near-wellbore area, caused by invaded components of a flushing fluid (or another drilling fluid) during operations of well drilling, completion, or servicing is of a particular importance.

Drilling fluids are complex mixtures of polymers, particles (having a size from hundreds of micrometers to less than one micron), clays, and other additives contained in a "carrier" fluid being "a base" of the drilling fluid; water, oil, or a synthetic fluid can act as the carrier fluid.

In the process of drilling, the filtrate of drilling fluid as well as fine particles contained therein, polymers, and other components, which are subjected to an excessive pressure, penetrate into a near-wellbore area and significantly change the properties of the reservoir rock (primarily, reduce porosity and permeability). A complex structure of the near-wellbore area is developed that, as a rule, is divided into an external filter cake (formed on the wellbore wall and consisting of filtered solid particles), an invaded zone (internal filter cake), and a filtrate penetration zone.

During the wellbore cleaning process (by gradual putting into production), the external filter cake is partially broken while the penetrated components of the drilling fluid are partially washed out of the near-wellbore area, and its permeability and porosity are partially restored. Nevertheless, a portion of the components remains irreversibly held in the pore space of a rock (adsorption on the surfaces of pores, capture in steam restrictions, etc.), which results in an essential difference between the initial permeability and the permeability restored after carrying out the cleaning process.

The presence of a zone with deteriorated properties provides a significant loss of the reservoir energy and reduces the reservoir productivity relative to its natural condition, affects data of drillstem testers and logging tools, making them difficult to interpret.

Information on the distribution of the invaded particles of drilling fluid into the near-wellbore area allows the identification of the mechanism of reducing permeability and the determination of an area where such a reduction occurs.

Processes of capturing/mobilizing components of drilling fluids in the near-wellbore area, and associated changes in its properties are non-stationary and dynamic of nature and are described by a set of empirical parameters. Knowledge of these parameters is necessary for quantitative analysis, diagnosis and control of the properties of the near-wellbore area in oil and gas reservoirs.

However, the proven experimental methods for determining parameters characterizing the dynamics of the accumulation of solid components of process fluids within the pore space and associated changes in the rock permeability today is virtually absent.

The conventional laboratory technique for checking the quality of drilling fluid is a filtration experiment for its action on a core sample, followed by back pumping (i.e., displacement of the penetrated drilling fluid with an initial formation fluid), during which the dynamics of the permeability deterioration/restoration is measured as a function of the pore volume of a fluid (drilling fluid or reservoir fluid) pumped.

The conventional laboratory technique allows the measurement of only the integral permeability of the core sample, which change is due to the dynamics of growth/destruction of the external filter cake on the outer end of the core and due to the accumulation/removal of the components of the drilling fluid in the rock.

However, it is known (see, for example, Bedrikovetsky P., Marchesin D., Shecaira F., Souza A L, Milanez P V, Rezende E. Characterisation of deep bed filtration system from laboratory pressure drop measurements. Journal of Petroleum Science and Engineering. 2001. V. 32, Issues 2-4, pp. 167-177) that the data of the filtration experiment is not sufficient to determine the parameters characterizing the dynamics of the accumulation of filtered impurities in the pore space and the parameters of the internal filter cake (invaded zone). There is a need for additional information.

Furthermore, the distribution of solid components of a contaminant (for example, drilling fluid) in the core sample after treatment (pumping) or after back pumping is important information in understanding the damage formation mechanism and to select a respective technique for increasing a wellbore productivity index (to minimize a damage of the near-wellbore area).

Determination of this parameter also requires additional methods.

U.S. Pat. Nos. 5,253,719 and 5,027,379 disclose methods for determining a drilling fluid invasion using a core X-ray computer tomography with addition of a contrast agent to the base of drilling fluid ("carrier fluid"). However, the use of a contrast agent soluble in "the carrier fluid" does not make it possible to evaluate the depth of penetration of low-contrast additives contained in a drilling fluid because the depth of invasion of the drilling fluid and the majority of used additives are usually different.

Another method is disclosed in U.S. Pat. No. 4,722,095. It is based on a high X-ray attenuation coefficient of barite widely used as a weighting agent in drilling fluid. Firstly, a fluid filtrate is removed from a core sample, after which the pore and the total volumes of the core sample as well as the volume of barite particles that penetrated into the sample are measured using X-ray computer tomography.

Unfortunately, the use of barite as a contrast agent to evaluate the drilling fluid penetration depth is not always justified because the size of these particles is comparable with the size of pore throats and, consequently, most of them will be captured in small pores near the sample entrance site.

Other drilling fluid components (clay, polymers, water etc.) have a weak X-ray contrast and cannot be spatially differentiated with the required accuracy.

U.S. Pat. No. 7,099,811 proposes the use of the experimental apparatus with a long core holder (up to 40 cm) and multiple taps for measuring pressure to monitor the dynamics of damaged and restored permeability profiles along the core sample. The permeability profiles measured during filtration under laboratory conditions are a part of the input parameters for hydrodynamic simulation experiments where the distribution of permeability in the near-wellbore area is taken into account, using a cylindrical grid pattern forming very small blocks (a few millimeters) around the well.

However, this method makes practically impossible to separate the effect of the external filter cake from the effect of the invaded zone on the permeability of the near-end area of the core sample (the end exposed to the drilling or another fluid). Furthermore, a change in a pressure drop along the core sample is associated with the action of two mechanisms: a change in the relative phase permeability of the main phase (oil and gas) due to the presence of filtrate and a change in the absolute permeability due to blocking a portion of pores with the contaminant components. A contribution of separate mechanisms in a decrease ("damage") of the permeability is important information, but individual effects of said mechanisms cannot always be separated from each other without additional measurements.

RF patent 2525093 discloses a method for predicting changes in the characteristics of the near-wellbore area (porosity, permeability, and saturation), caused by the action of drilling fluid, wherein the method involves a combination of mathematical modeling and laboratory filtration experiments on a core sample, wherein it is suggested to use a profile of the volume concentration of drilling fluid particles penetrated into the core sample to determine unambiguously parameters of the invaded zone and to obtain porosity and permeability profiles. The profile of the volume concentration of penetrated particles is proposed to obtain by using data of X-ray computed microtomography of the core sample, which is performed after the filtration experiment. However, this method is not applicable to low-contrast components. In addition, the accurate determination of the volume concentration profile of penetrated particles requires X-ray computed microtomography of the core sample with a resolution of at least 2 to 3 microns per voxel (voxel is the smallest element of three-dimensional image of a rectangular shape), which imposes a severe limitation on the maximum size of a scanned area and takes a lot of time for scanning and processing of data.

RU patent 2548930 describes a method for determining the distribution and a profile of a contaminant penetrated into porous medium, the method comprising coloring the solid components of the studied contaminant with a cationic dye, injecting the suspension of the colored contaminant through a porous medium sample, then splitting the porous medium sample, and analyzing the distribution and intensity of the cationic dye in the split. Fuchsine and/or methylene blue and/or brilliant green or other cationic dyes can be used as the dyes. It is possible to use cationic dyes having special properties, for example, fluorescent dyes. However, this method does not make it possible to obtain directly the distribution of the volume or mass concentration of penetrated colored component since for this purpose it is necessary to determine the quantitative relationship between these values and the color intensity of the cationic dye in the split.

SUMMARY

The disclosed method provides for a simple, cost-effective quantitative determination of the distribution of the volume and mass concentration of suspension solid particles invaded in a porous medium, without a need for special equipment. In addition, to the resulting distribution of the volume and mass concentration, their profile along the axis of the porous medium sample can also be determined. Based on the volume concentration profile of the invaded suspension particles, it is possible to determine empirical parameters describing the capture of the suspension particles in the porous medium. In addition, based on the resulting parameters of capturing the suspension particles and the measurements of the flow rate of the suspension injected into the sample and a pressure drop, it is possible to determine a relationship between the permeability of the porous medium and the volume concentration of penetrated particles. The resulting parameters of capturing the suspension particles and the determined relation between the permeability of the porous medium and the volume concentration of the penetrated particles allow the determination of the parameters of an internal filter cake and a change in the properties of the near-wellbore area.

In accordance with the proposed method, solid particles are colored with a cationic dye, and at least three calibration standards with different known mass concentrations of the colored particles are prepared by mixing the colored particles with grains of a granular medium. Said grains of the granular medium have a color similar to the color to the studied porous medium.

The prepared calibration standards are photographed to obtain images of all the prepared calibration standards. Then digital analysis of the obtained images of the calibration standards is carried out based on an additive RGB color model and intensity distribution profiles of red, green and blue colors are obtained for each calibration standard.

Based on an analysis of the obtained intensity distribution profiles of red, green and blue colors in the calibration standards, a single norm function is selected to characterize quantitatively changes in the red, green and blue colors in all calibration standards.

A single calibration curve is obtained by comparing values of the selected norm functions for each calibration standard with a known mass concentration of the colored particles in this calibration standard.

A suspension with the colored particles is prepared, and the suspension is injected through a studied porous medium sample. After the injection of the suspension of colored solid particles, the porous medium sample is divided into two parts along the suspension flow direction, an obtained sample split is photographed under the same conditions which were used to obtain the images of the calibration standards, and an image of the split of the of porous medium sample is obtained.

The resulting image of the sample split is subjected to digital analysis, based on an additive RGB color model and a two-dimensional intensity distribution of red, green and blue colors on the sample split is obtained. Then, reference intensities are determined for red, green and blue colors.

A two-dimensional distribution of the mass concentration of the colored suspension solid particles is obtained based on the obtained two-dimensional intensity distribution of red, green and blue colors in the obtained image of the samples split, using the determined reference intensities for red, green and blue colors, the selected norm function and the previously obtained calibration curve.

The images of all the standards can be located on a single or on different photographs obtained under the same conditions.

In one embodiment of the invention, the porous medium sample is a rock core, and the suspension is a drilling fluid.

The background values for red, green and blue colors can be determined by an area of the sample split image where the invaded suspension particles are absent.

In accordance with another embodiment of the invention, the sample split of the porous medium is combined with at least one split of another similar sample that does not contain invaded suspension particles and is additionally photographed, the reference intensities for red, green and blue colors are determined by an area of the obtained image were the sample split does not comprise invaded suspension particles.

Intensity profiles of red, green and blue colors of suspension solid particles along the sample split can be determined based on the obtained two-dimensional intensity distribution of red, green and blue colors in the sample split by spatial averaging in the direction perpendicular to the flow direction of the suspension during injection.

The obtained two-dimensional distribution of the mass concentration of the colored suspension particles allows determining profiles of the mass concentration of the solid suspension particles along the sample split by spatial averaging in the direction perpendicular to the flow direction of the suspension during injection.

The obtained two-dimensional distribution of the mass concentration of the solid suspension particles in the sample split allows, in turn, the calculation of a two-dimensional distribution of a porous medium volume portion occupied by the solid suspension particles, according to the formula:

$$\sigma = (1-\varphi)\frac{\rho_{skel}}{\rho_s}C_s$$

where $\sigma$ is the porous medium volume portion occupied by the suspension particles, $C_s$ is a mass concentration of the solid suspension particles in the porous medium, $\rho_s$ is a density of a material of the solid suspension particles, $\rho_{skel}$ is a density of a material matrix of the porous medium, and $\varphi$ is a porosity.

In accordance with another embodiment of the invention, after injection of the colored particles into the porous medium sample, the sample is dried until a complete removal of pore water, and a two-dimensional distribution of the porous medium volume portion occupied by the suspension particles is calculated based on the obtained two-dimensional distribution of the mass concentration of the suspension particles in the sample split, according to the formula:

$$\sigma = \gamma(1-\varphi)\frac{\rho_{skel}}{\rho_s}C_s$$

where $\sigma$ is the porous medium volume portion occupied by the suspension particles, $C_s$ is a mass concentration of the solid suspension particles in the porous medium, $\rho_s$ is a density of a material of the solid suspension particles, $\rho_{skel}$ is a density of a material matrix of the porous medium, $\varphi$ is a porosity, and $\gamma$ is a swelling factor.

In accordance with one embodiment of the invention, the obtained two-dimensional distribution of the porous medium volume portion occupied by the solid particles is used to determine a profile of the porous medium volume portion occupied by the solid suspension particles by spatial averaging in the direction perpendicular to the flow direction of the suspension during injection.

In accordance with another embodiment of the invention, the obtained two-dimensional distribution of the porous medium volume portion occupied by the solid particles is also used in the calculation of a two-dimensional distribution of the porous medium volume portion occupied by a package of the solid suspension particles, according to the formula:

$$\sigma_{fc} = \frac{\sigma}{1-\varphi_{fc}}$$

where $\sigma_{fc}$ is the porous medium volume portion occupied by the package of the solid suspension particles, $\varphi_{fc}$ is an inherent porosity of the solid suspension particles.

The obtained two-dimensional distribution of the porous medium volume portion occupied by the package of the solid suspension particles is used to determine a profile of the porous medium volume portion occupied by the package of the solid suspension particles by spatial averaging in the direction perpendicular to the flow direction of the suspension during injection.

In accordance with another embodiment of the invention, empirical parameters describing a capture of particles in the porous medium is determined by achieving the best correspondence between the profile of the porous medium volume portion occupied by the solid particles, the correspondence being obtained by solving (analytically or numerically) an appropriate mathematical model of a filtration process of the suspension, and the profile determined based on the digital analysis of the image of the sample split. During injection of the suspension of the colored particles through the sample, a pressure drop along the sample and the flow rate of the injected suspension can be measured, and the empirical parameters describing the capture of the particles in the porous medium serve as a basis for the determination of a type of dependence between the porous medium permeability and the porous medium volume portion occupied by the solid suspension particles by achieving the best correspondence between the pressure drop and the flow rate of the suspension during injection, which are obtained by solving (analytically or numerically) an appropriate mathematical models of the filtration process of the suspension, and experimentally measured values.

The obtained empirical parameters describing the capture of particles in the porous medium, and the type of dependence between the porous medium permeability and the porous medium volume portion occupied by the suspension particles can be used to determine parameters of an internal filter cake and to predict a change in properties of a near-wellbore area, the change being caused by the penetrated components of the drilling fluid.

In accordance with another embodiment of the invention, during injection of the suspension of the colored particles through the sample, a pressure drop along the sample and a flow rate of the injected suspension are measured, and empirical parameters describing a capture of the particles in the porous medium and a type of dependence between the porous medium permeability and the porous medium volume portion occupied by the suspension particle suspension are determined by achieving the best correspondence simultaneously between the pressure drop and the flow rate of the injected suspension, which are obtained by solving (analytically or numerically) an appropriate mathematical model of a filtration process of the suspension, and experimentally measured values, and between a profile of the porous medium volume portion occupied by the solid particles, the profile being obtained by solving (analytically or numerically) an appropriate mathematical model of the filtration process of the suspension, and the profile determined based on the digital analysis of the image of the sample split. The obtained parameters describing the capture of particles in the porous medium, and the type of dependency between the permeability porous medium permeability and the porous medium volume portion occupied by the solid suspension particles may be used to determine parameters of an internal filter cake and to predict a change in the properties of a near-wellbore area, the change being caused by the penetrated components of the drilling fluid.

DETAILED DESCRIPTION

The mathematical description of a non-stationary filtration process of suspension (i.e. liquid containing suspended solid particles, which called below "contaminant") through a porous medium requires in addition to the equations of a mass balance of filtered fluids, the equation of transport and capture of the suspension particles in the porous medium (see. For example Theuveny, B., Mikhailov, D., Spesivtsev, P., Starostin, A., Osiptsov, A., Sidorova, M. and Shako, V. 2013. Integrated approach to simulation of near-wellbore and wellbore cleanup. SPE 166509).

The dynamics of capturing suspension particles in a porous medium is usually mathematically described (see, for example, Herzig J. P., Leclerc D. M. and Le Goff P., 1970, Flow of suspensions through porous media—Application to deep filtration Industrial and Engineering Chemistry Vol. 62 . . . No. 5. pp. 8-35) by the equation:

$$\frac{\partial \sigma}{\partial t} = \lambda_0 F(\sigma) w C \qquad (1)$$

where t is time; C is a volume concentration of mobile suspension particles; σ is a porous medium volume portion occupied by captured suspension particles ("volume portion"); w is the filtration rate of a carrier phase; $\lambda_0$ is a capture factor; F(σ) is a correction function of dependence between the rate of capturing particles and the porous medium volume portion occupied by the captured suspension particles.

The filtration rate of carrier phase w is determined in accordance with Darcy's law:

$$w(t) = \frac{k(\sigma)}{\mu} \frac{\partial}{\partial x} p \qquad (2)$$

where μ is viscosity; p is pressure; k(σ) is the porous medium permeability that depends on the porous medium volume portion occupied by the captured components.

If only one saturated fluid is present, the equation describing the process of transporting particles in the porous medium is as follows:

$$\frac{\partial}{\partial t}\varphi(\sigma)C + w\frac{\partial}{\partial x}C = -\frac{\partial}{\partial t}\sigma \qquad (3)$$

The capture of particles in the pore spaces reduces the porosity of the porous medium according to the relation $$\varphi(\sigma) = \varphi_0 - \sigma \qquad (4)$$

where φ is the current porosity, $\varphi_0$ is the initial porosity of the porous medium.

If only one saturated fluid is present, at a small change in porosity $\varphi \approx \varphi_0$ and correction function F(σ)≈1, an analytical solution for the volume concentration of mobile contaminant particles (5) and the porous medium volume portion occupied by captured suspension particles (6) is as follows:

$$C = \begin{cases} C_0 \exp(-\lambda_0 x), & W_{inj}(t) > x\varphi_0 \\ 0, & W_{inj}(t) \leq x\varphi_0 \end{cases} \quad (5)$$

$$\sigma = \begin{cases} \lambda_0 \lfloor W_{inj}(t) - x\varphi_0 \rfloor C_0 \exp(-\lambda_0 x), & W_{inj}(t) > x\varphi_0 \\ 0, & W_{inj}(t) \leq x\varphi_0 \end{cases} \quad (6)$$

where x is a spatial coordinate (along the axis of the porous medium sample), $W_{inj} = Q(t)/A$ is injected volume $Q(t)$ referred to cross-sectional area A.

An analytical solution is also known for more complex dependence of the capture factor of particles on the portion of captured particles, such as $F(\sigma)=1+b\sigma$, at a low change in porosity (see, for example Shechtman Yu.M. Filtratsiya malokontsentrirovannyh suspenzii [Filtering of low-concentration suspensions], Moscow, Nedra, 1961, pp. 70-72; Civan F., "Reservoir formation damage: fundamentals, modeling, assessment and mitigation" Second Edition Gulf Publishing Company 2007. 1089 p, p. 796; Herzig J. P., Leclerc D. M., Le Goff P. 1970. Flow of suspensions through porous media—application to deep filtration Industrial and Engineering Chemistry Vol. 62. No. 5. pp. 8-35):

$$C = \begin{cases} C_0 \dfrac{\exp(\lambda_0 C_0 b \lfloor W_{inj}(t) - x\varphi_0 \rfloor)}{-1 + \exp(\lambda_0 x) + \exp(-\lambda_0 C_0 b [W_{inj}(t) - x\varphi_0])}, & W_{inj}(t) > x\varphi_0 \\ 0, & W_{inj}(t) \leq x\varphi_0 \end{cases} \quad (7)$$

$$\sigma = \begin{cases} -\dfrac{1}{b} \dfrac{1 - \exp(-\lambda_0 C_0 b \lfloor W_{inj}(t) - x\varphi_0 \rfloor)}{1 - \exp(\lambda_0 x) - \exp(-\lambda_0 C_0 b [W_{inj}(t) - x\varphi_0])} & W_{inj}(t) > x\varphi_0 \\ 0, & W_{inj}(t) \leq x\varphi_0 \end{cases} \quad (8)$$

Conventional methods for determining a capture factor $\lambda 0$ of particles in the pore space, and function $F(\sigma)$ are based on the measurements of the dynamics of the dispersed phase concentration at the sample outlet (see, for example, Bai R., Tien C. Effect of deposition in deep-bed filtration: Determination and search of rate parameters// Journal of Colloid and Interface Science 2000. V. 231. pp. 299-311; Wennberg K. E., Sharma M. M. Determination of the filtration coefficient and the transition time for water injection wells// SPE 38181. 1987. pp. 353-364). In this case, the unknown parameters are determined either by using analytical solutions (5) or (7) for the volume concentration of mobile suspension particles or, if it is impossible to reproduce the measured dynamics of the dispersed phase concentration at the sample outlet by solutions (5) or (7), by using numerical solution of an equation system comprising the equation of capture of the suspension particle in the pore space (1) and the equation of transport of the particles in the porous medium (3).

A method of determining the capture factor by measuring the dynamics of a pressure drop in two core segments is known (Bedrikovetsky P., Marchesin D., Shecaira F., Souza A L, Milanez P V, Rezende E. Characterisation of deep bed filtration system from laboratory pressure drop measurements// Journal of Petroleum Science and Engineering. 2001. V. 32. No. 2-4. pp. 167-177).

However, if the rate of capturing particles is high, which is typical for the filtration of drilling fluids through a core sample, the concentration of particles at the outlet is small and cannot be detected with a good accuracy. In such a case, the method based on measuring a pressure drop in two different segments of the sample will be also complicated.

In this case, the empirical parameters describing the process of capturing particles in the porous medium (capture factor $\lambda_0$ and correction function $F(\sigma)$) can be determined by reproducing the profile of invaded particles at a known volume of the injected suspension, using either analytical solutions of (6) or (8) for the porous medium volume portion occupied by captured suspension particles or using a numerical solution of an equation system including of the equation of capture of the suspension particles in the pore space (1) and the equation for transport of the particles in porous media (3).

At the next step, when capture factor $\lambda_0$ and correction function $F(\sigma)$ are determined, a type of dependence $k(\sigma)$ between the porous medium permeability and the porous medium volume portion occupied by captured suspension particles are determined by reproduction of the dynamics of a pressure drop and the flow rate of the injected fluid, which were recorded in experiment.

The following types of dependency between the porous medium permeability and the porous medium volume portion occupied by captured particles are most frequently used (see, for example, Herzig J. P., Leclerc D. M., Le Goff P. Flow of suspensions through porous media—application to deep filtration// Industrial and Engineering Chemistry. 1970. V. 62. No. 5. pp. 8-35):

$$k(\sigma) = \frac{k}{1+\beta\sigma} \quad (9)$$

or $$k(\sigma) = \left(1 - \frac{\sigma}{\varphi_0}\right)^M \quad (10)$$

where $\beta$, M are empirical factors.

There is known a more complex relation (Sharma M. M., Pang S. Injectivity decline in water injection wells: an offshore Gulf of Mexico Case Study SPE 38180)

$$k(\sigma) = \frac{k}{1+\beta\sigma}\left(1 - \frac{\sigma}{\varphi_0}\right)^M \quad (11)$$

If captured suspension particles form inside the porous space a package having its own considerable porosity, then the porous medium permeability depends on its volume portion occupied by the package of captured contaminant particles $\sigma_{fc}$, but not by the volume portion occupied by captured particles $\sigma$, i.e. $k = k(\sigma_{fc})$.

In this case, the porous medium volume portion $\sigma_{fc}$ occupied by the package of suspension particles is calculated according to the equation:

$$\sigma_{fc} = \frac{\sigma}{1 - \varphi_{fc}} \quad (12)$$

where $\sigma_{fc}$ is an inherent porosity of the package of the suspension particles (inherent porosity of an internal filter cake).

The above mathematical model describing the transport and capture of the suspension particles in the porous medium can be generalized.

For example, if porous medium is characterized by a complex structure of the pore space, the model may further comprise at least two pore continua having different properties (see, for example, Gruesbeck C., Collins R. E. Entrainment and deposition of fine particles in porous media// SPE 8430. 1982. pp. 847-856):

$$\frac{\partial}{\partial t}[\varphi_i(\sigma_i)C_i] + w_i\frac{\partial}{\partial x}C_i = -\frac{\partial}{\partial t}\sigma_i \quad (13)$$

$$\frac{\partial}{\partial t}\sigma_i = \lambda_{i0}F_i(\sigma_i)C_iw_i \quad (14)$$

where subscript i numbers a group of pore, and φi=φi₀-σi.

In this case, the rate of filtration is determined for each block according to Darcy's law:

$$w_i = -\frac{k_i(\sigma_i)}{\mu_0}\frac{\partial}{\partial x}p_i \quad (15)$$

As additional empirical parameters, there are added ratio αi of the initial porosity of each continuum to the total porosity:

$$\alpha_i = \frac{\varphi_{i0}}{\varphi_0} \quad (16)$$

where the total porosity is $$\varphi_0 = \sum_i \varphi_{i0},$$

and ratio ξi of the initial permeability of each continuum to the total permeability:

$$\xi_i = \frac{k_{i0}}{k_0} \quad (17)$$

Empirical parameters (parameters of capture of the particles in each continuum, ratio αi of the porosity of each continuum to the total porosity, ratio ξi of the permeability of each continuum to the total permeability, and type of dependence between the permeability of each continuum and the volume portion of captured particles in this continuum) are determined by reproducing the registered dynamics of a pressure drop and flow rate of the injected fluid, as well as the profile of the volume portion of invaded particles by using a numerical solution of the equation system.

If the suspension particles have substantially different properties (for example, there are several groups of particles with different geometric sizes), at least two types of particles can be introduced in the model (see, for example, Theuveny B., Mikhailov D., Spesivtsev P., Starostin A., Osiptsov A., Sidorova M., and Shako V. 2013. Integrated approach to simulation of near-wellbore and wellbore cleanup SPE 166509):

$$\frac{\partial}{\partial t}[\varphi(\sigma_\Sigma)C_j] + w\frac{\partial}{\partial x}C_j = -\frac{\partial}{\partial t}\sigma_j \quad (18)$$

-continued $$\frac{\partial}{\partial t}\sigma_j = \lambda_{j0}F_j(\sigma_j)C_jw \quad (19)$$

where subscript j numbers the type (group) of particles.

In this case, the porous medium volume portion occupied by captured particles of all types is defined as:

$$\sigma_\Sigma = \sum_j \sigma_j \quad (20)$$

and a change in porosity is equal to:

$$\varphi(\sigma_\Sigma) = \varphi_0 - \sigma_\Sigma \quad (21)$$

The rate of filtration is determined according to Darcy's law $$w = -\frac{k(\sigma_\Sigma)}{\mu_0}\frac{\partial}{\partial x}p \quad (22)$$

Empirical parameters (parameters of capture of each type particles and type of dependence between the porous medium permeability and the porous medium volume portion occupied by captured particles of all types) are determined by reproducing the recorded dynamics of a pressure drop and the flow rate of the injected fluid, and the profile of the volume portion of invaded particles by using numerical solutions of the equation system.

In general, when the structure of the pore space is complex, and the suspension particles have substantially different properties, the mathematical model of transporting and capturing particles can be generalized by introducing at least two continua of pores having different properties and at least two types of particles having different properties.

Based on the known porous medium volume portion occupied by captured particles, it is possible to calculate the mass concentration of captured particles.

By definition, the porous medium volume portion occupied by captured particles is equal to $$\sigma = \frac{V_s}{V_{bulk}} \quad (23)$$

where $V_s$ is the volume of captured particles and $V_{bulk}$ is the elementary volume of porous medium.

The weight of captured particles is $$M_s = \rho_s V_s \quad (24)$$

where $\rho_s$ is a density of a material of which captured particles are composed.

The weight of the material composing a matrix is $$M_{skel} = \rho_{skel}V_{skel} = \rho_{skel}(1-\varphi)V_{bulk} \quad (25)$$

where $\rho_{skel}$ is a density of a material matrix of the porous medium, φ is a porosity, $V_{skel}$ is the volume occupied by the matrix of the porous medium ($V_{skel}=(1-\varphi)V_{bulk}$).

Taking into account (23), (24) and (25), it is possible to obtain a relation between the mass concentration $C_s$ of particles and the porous medium volume portion σ occupied by captured particles:

$$C_s = \frac{M_s}{M_{skel}} = \frac{1}{(1-\varphi)} \frac{\rho_s}{\rho_{skel}} \sigma \qquad (26)$$

or, conversely, a relation between the porous medium volume portion σ occupied by captured particles and the mass concentration $C_s$ of the particles:

$$\sigma = (1-\varphi) \frac{\rho_{skel}}{\rho_s} C_s \qquad (27)$$

If the suspension particles are swollen (e.g., clay), then the volume of the captured particles in the dried condition $V_s^{dry}$ and the volume of the captured particles in the wet condition $V_s^{wet}$ are linked by swelling factor γ:

$$V_s^{wet} = \gamma V_s^{dry} \qquad (28)$$

The ratio between the porous medium volume portion σ occupied by captured particles and the mass concentration $C_s$ of particles will be as follows:

$$\sigma = \gamma(1-\varphi) \frac{\rho_{skel}}{\rho_s} C_s \qquad (29)$$

Some examples of the implementation of the method are illustrated below.

The first example is filtration of bentonite particles through a sample of sandstone Buff Berea (initial porosity $\varphi_0=0.22$, the initial water permeability $k_0=220$ mD). Bentonite is one of the most commonly used components of drilling fluids, and its invasion in a reservoir results in a significant reduction in permeability. A direct detection of invasion bentonite particles in a sandstone sample is difficult for the following reasons: firstly, the color of bentonite is similar to the color of sandstone, and secondly, most of the natural sandstones comprise their own clays. The use of high-contrast cationic dye makes allows reliable detection of invaded bentonite particles and the determination of their location. Brilliant Green (triarylmethane dye, C29H37N2O4) was selected as a cationic dye.

Bentonite clay particles were colored as follows. The particles of bentonite clay were dispersed in an aqueous sodium chloride (18 g of NaCl and 10 g of bentonite were added to 1 liter of water, and the mixture was stirred at 24,000 rpm for 20 minutes), a dye in a concentration of 0.2 mg-eq./100 g (alcohol Brilliant Green) was added, and the clay mixture was stirred for 5 minutes at low speed of a mixer. The resulting solution was dried to obtain dry colored clay particles.

9 "calibration standards" were prepared at different mass concentrations of colored particles (0%, 0.01%, 0.02%, 0.05%, 0.1%, 0.25%, 0.5%, 1%, 2%) by stirring bentonite particles with river sand.

The prepared "calibration standards" were photographed.

Figure 1A:
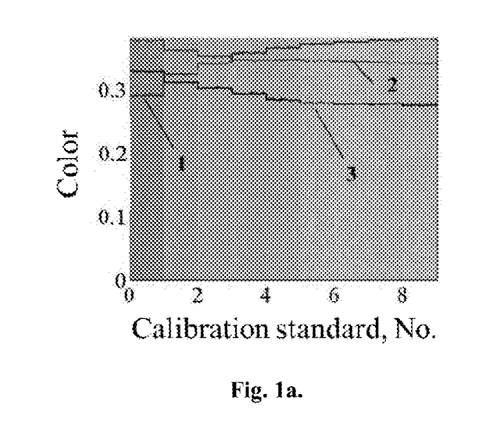
FIG. 1a shows intensity profiles for red (number 1), green (number 2), and blue (number 3) colors in nine color calibration standards (the first embodiment of the invention)

The obtained images of the calibration standards were subjected to digital analysis, using the software package MathLab®, imread function, based on the additive RGB (red, green, blue) color model, the intensity distribution of red, green and blue colors in the images of the calibration standards was determined and intensity profiles for red, green and blue colors were obtained for each calibration standard (FIG. 1a, where the intensity profile for red color is indicated as 1, the intensity profile of green color is indicated as 2, and the intensity profile of blue color is indicated as 3).

Figure 1B:
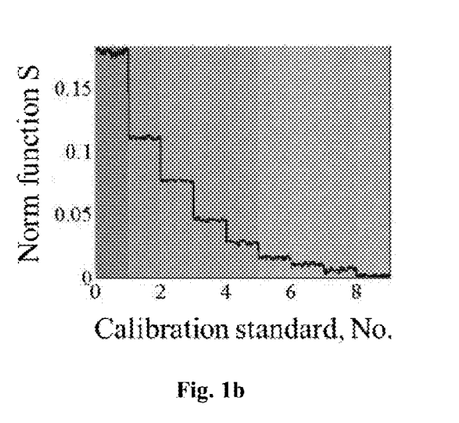
FIG. 1b shows the distribution of norm function S that quantitatively characterizes changes in red, green and blue colors in nine calibration standards.

Based on the analysis of the distribution of red, green and blue colors in the images of the calibration standards, a norm function (FIG. 1b) was obtained to quantitatively characterize changes in red, green and blue colors:

$$S = |R\ R_0| + |G\ G_0| + |B\ B_0|,$$

$$R+G+B \equiv 1,$$

where $R_0$, $G_0$, and $B_0$ are "reference" values of red, green and blue colors, which correspond to the calibration standards which are free of bentonite particles (mass concentration of colored bentonite particles is 0%).

Figure 2:
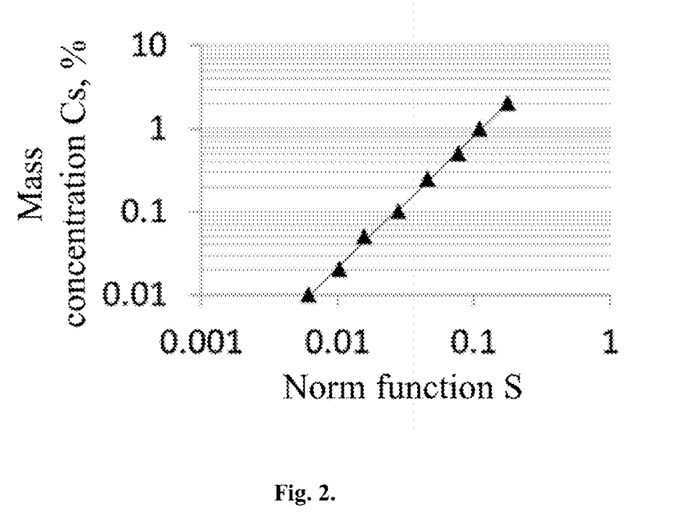
FIG. 2 shows a calibration curve: a ratio between the value of the selected norm function S and the mass concentration $C_s$ of colored bentonite particles in nine calibration standards.

The calibration curve (FIG. 2) was also obtained, i.e. the ratio between the value of the selected norm function S and mass concentration $C_s$ of bentonite colored particles in the calibration standards is:

$$C_s = AS^B,$$

where A≈30.81, B≈1.58.

Suspension of particles of the colored bentonite clay was prepared at a required concentration.

A filtration experiment for injection of the prepared colored bentonite suspension through a sample of sandstone Buff Berea (($\varphi_0=0.22$, $k_0=220$ mD) was performed.

The sandstone sample was split (after injection of suspension) along the direction of the filtration.

The sandstone sample split was photographed under the same conditions (lighting, camera, shutter speed, aperture, etc.), under which the photographs of calibration standards were made.

Assuming that the parameters of the porous medium are the same in any plane perpendicular to the flow direction of the suspension during injection, i.e. any split of the sample is representative, the distribution of the mass concentration of colored suspension particles (or any other parameter) in the sample split reproduces the distribution of the mass concentration of the colored suspension particles (or any other parameter) in the porous medium.

Figure 3A:
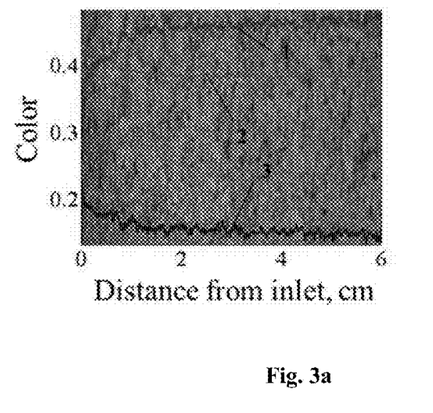
FIG. 3a shows the intensity profiles for red (number 1), green (number 2), and blue (number 3) colors for a sandstone sample Buff Berea after injection of a 1% solution of colored bentonite.

The image of sandstone sample split was subjected to digital image analysis, using standards and the application software MathLab®, imread function, and the intensity distribution of red, green and blue colors in the image was obtained, and the intensity profiles of the red, green and blue colors along the photograph was determined by spatial averaging the obtained intensity distribution of the corresponding colors (FIG. 3a, where the intensity profile of red color is indicated as 1, the intensity profile of green color is indicated as 2, and intensity profile of blue color is indicated as 3).

An area was selected in the photograph of the sandstone sample split, which did not contain invaded suspension particles, and reference intensities of red, green and blue colors (i.e., values corresponding to the average intensity of red, green and blue colors in the sample without the invaded colored particles) were obtained.

Figure 3B:
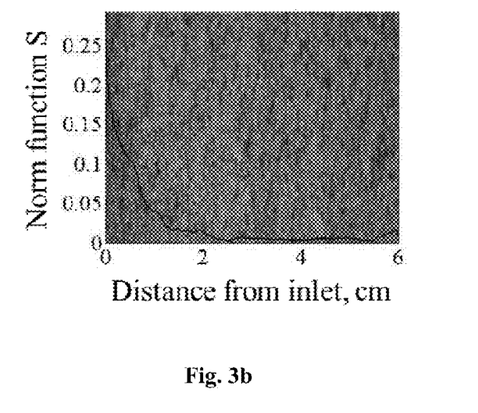
FIG. 3b shows the distribution profile of norm S for the sandstone sample Buff Berea after injection of the 1% bentonite solution.

A profile of the mass concentration of the penetrated particles was determined in the flow direction of the suspension during injection, based on the intensity profiles for red, green and blue colors along the photograph (FIG. 3a) by using the selected norm function (the distribution profile of the norm function along the photograph of the split is shown in FIG. 3b), and a calibration curve is plotted.

Figure 4:
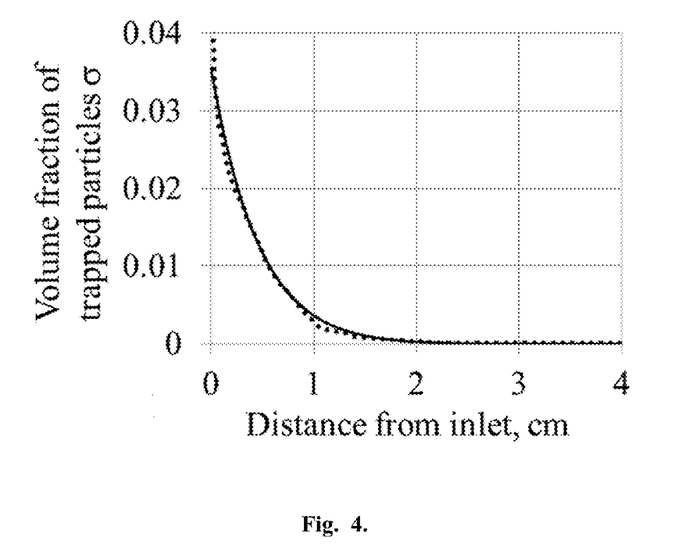
FIG. 4 shows the profile of a volume portion of captured bentonite particles (dotted line) and a simulation result (solid line) for the sandstone sample Buff Berea after injection of the 1% colored bentonite.

The profile of the volume concentration σ of the invaded particles was calculated based on the obtained profile of the mass concentration according to equation (24) comprising known density of the particle material $p_s$, density of the matrix material of the porous medium $\rho_{skel}$, porosity $\varphi$, and swelling factor $\gamma$ (FIG. 4, dotted line):

$$\sigma = \gamma(1-\varphi)\frac{\rho_{skel}}{\rho_s}C_s$$

The obtained profile of the volume concentration of the invaded particles along the flow direction was used to determine parameters of capture of the particles (FIG. 4, solid line.): $\lambda_0=186$ m$^{-1}$, swelling factor: $\gamma=5$ for the sample of sandstone Buff Berea, after injection of the 1% colored bentonite solution.

Figure 5:
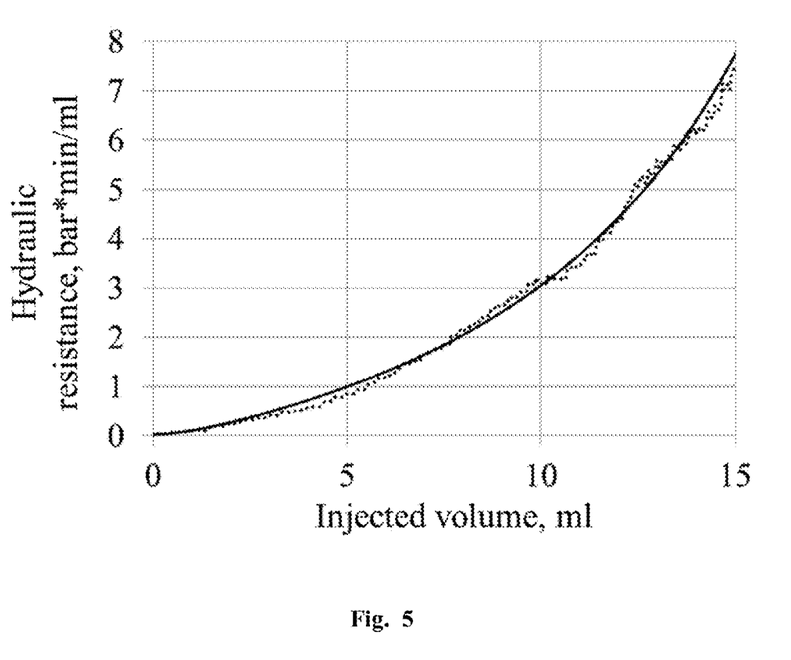
FIG. 5 shows the profile of flow resistance (dotted line) and a simulation result (solid line) for the sandstone sample Buff Berea after injection of the 1% colored bentonite.

Parameters of a reduction in permeability (11) were determined by reproducing the experimental profile of the fluid resistance (FIG. 5) at $\beta=3574$, M=2.6, for the sample of sandstone Buff Berea sample after injection of the 1% colored bentonite solution.

The second example is filtration of bentonite particles through a sample of limestone Indiana Limestone ($\varphi_0=0.16$, $k_0=53$ mD) that is characterized by a more complex structure of the pore space.

The sequence of operations, starting with the preparation of calibration standards and aqueous bentonite solution to obtaining the profile of the volume concentration of invaded particles along the flow direction is the same as in the first example.

Figure 6:
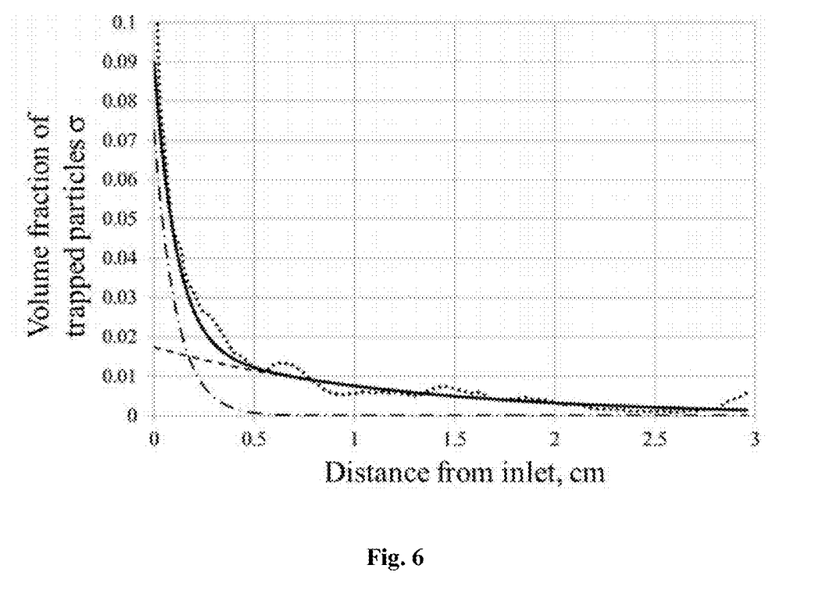
FIG. 6 shows the profile of a volume portion of captured bentonite particles in a sample of limestone Indiana Limestone after injection of the 1% colored bentonite (dotted line) and a simulation results obtained based on the model of two continua: the total profile (solid line), a separate profile for each continuum (dotted and dashed lines)

A difference is in the procedure of determining the parameters of capture of the particles, wherein the determination is performed based on the obtained profile of the volume concentration of the penetrated particles (FIG. 6 dotted line). These parameters were determined by using a two-continuum model (13), (14), where i=1, 2, since the profile could not be reproduced in a model with a single continuum. The model parameters were as follows: $\varphi_1/\varphi_0=0.55$; $\lambda_1=79$ min$^{-1}$, $\lambda_2=907$ m$^{-1}$, swelling factor $\gamma=2$.

Figure 7:
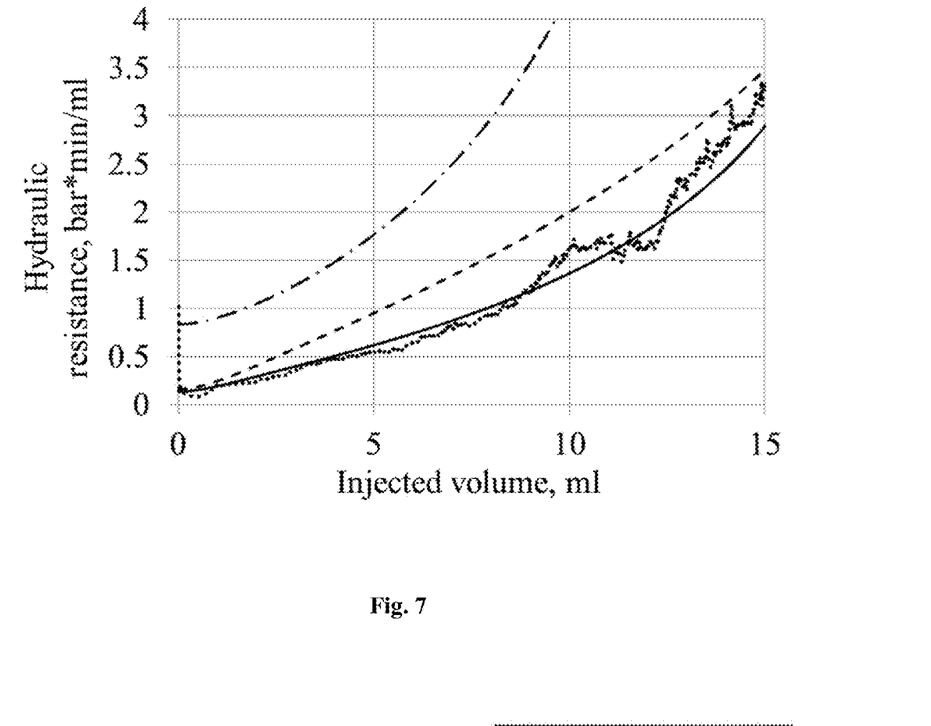
FIG. 7 shows the profile of flow resistance for the sample of limestone Indiana Limestone after injection of the 1% colored bentonite (dotted line) and simulation results obtained based on the model of two continua: the total profile (solid line), a separate profile for each continuum (dotted and dashed line)

The simulation results are shown in FIG. 6, solid line. The simulation results of the parameters of a reduction in permeability are shown in FIG. 7, solid line (where the flow resistance was determined as the ratio of a pressure drop at a given time $\Delta p(t)$ to the volume flow rate q(t) of the fluid at a given time). Parameters of the model were as follows: $k_{01}/k_0=0.84$; $\beta_1=2687$, $\beta_2=1073$; $M_1=3.4$, $M_2=1.3$.

The following type of dependence between the permeability of each continuum and the volume concentration of the penetrated particles in this continuum was obtained:

$$k_i(\sigma_i) = \frac{k_{i0}}{1+\beta_i\sigma_i}\left(1-\frac{\sigma_i}{\varphi_{i0}}\right)^{M_i},$$

where $\beta_i$, $M_i$ are empirical coefficients.

The third example of the invention is similar to the first one, but instead of nine calibration standards with the mass concentration of colored particles of 0%, 0.01%, 0.02%, 0.05%, 0.1%, 0.25%, 0.5%, 1%, 2%, ten calibration standards at mass concentrations of colored particles of 0%, 0.2%, 0.5%, 1%, 2%, 5%, 7.5%, 10%, 12.5%, 15% were prepared by mixing bentonite colored particles with river sand.

The prepared "calibration standards" were photographed.

Figure 8A:
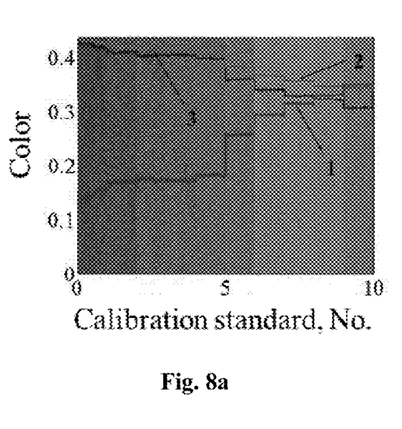
FIG. 8a shows the intensity profiles for red (number 1), green (number 2), and blue (number 3) colors in ten calibration standards (the third embodiment of the invention)

The resulting image of calibration standards were subjected to digital analysis, using the application software MathLab®, imread function, based on the additive RGB (red, green, blue) color model, the intensity distribution of red, green and blue colors in the photography of the calibration standards was determined to obtain the intensity profiles of red, green and blue colors for each calibration standard (FIG. 8a, where the intensity profile of red color is indicated as 1, the intensity profile of green color is indicated as 2, and the intensity profile of blue color is indicated as 3).

Figure 8B:
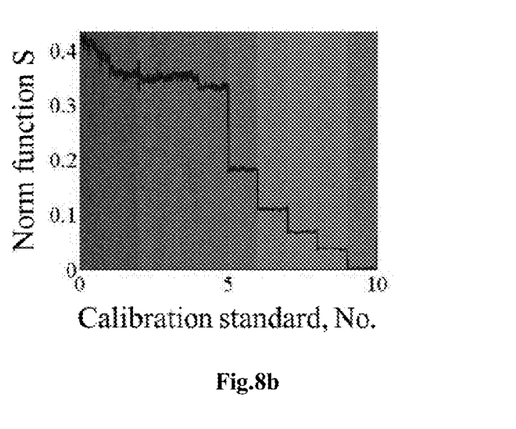
FIG. 8b shows the distribution of norm S that quantitatively characterizes a change in red, green and blue colors.

A norm was obtained based on the analysis of the distribution of red, green and blue colors in the image of the calibration standards (FIG. 8b.) to quantitatively characterize changes in red, green and blue colors:

$$S=|R\ R_0|+|G\ G_0|+|B\ B_0|,$$

$$R+G+B=1,$$

where $R_0$, $G_0$, and $B_0$ are "background" values of red, green and blue colors, which correspond to the "clean" site of the core (i.e., without penetrated bentonite).

Figure 9:
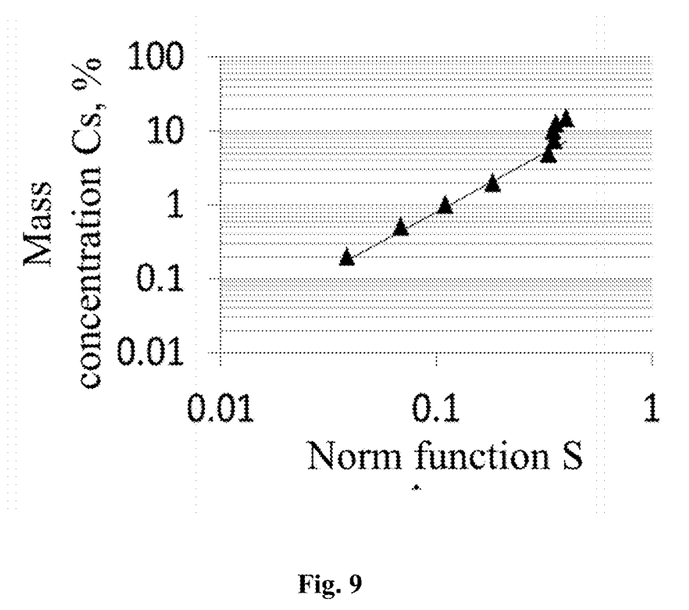
FIG. 9 shows a calibration curve which is a ratio between the value of the selected norm S and the mass concentration $C_s$ of colored bentonite particles in ten calibration standards (third embodiment of the invention).

The calibration curve (FIG. 9) was plotted, i.e. the ratio between the value of the selected norm function S and the mass concentration $C_s$ of the colored bentonite particles in the calibration standards $$C_s=AS^B,$$

where $A\approx30.81$, $B\approx1.58$.

The remaining steps are similar to those in the first example.

Two examples of the procedure of coloring bentonite with different cationic dyes are given below. In both examples, the bentonite clay first was dispersed in 2% solution of sodium chloride in a blender, and then a required amount of dye in the form of an alcohol solution was added thereto (an aqueous solution, a solution in another solvent, or a dry dye may also be used) under vigorous stirring to obtain uniform coloration of bentonite particles.

In both examples, 5% bentonite suspension was prepared by using 50 g of bentonite and 950 g of the sodium chloride solution.

In the first example, the used dye was Brilliant green dye (C27H34N2O4S) in an amount of 0.4 mg-eq./100 g of bentonite (10 g of a 1% dye solution in alcohol per 1 kg of 5% bentonite suspension). When this dye was used, the bentonite clay was colored in green.

In the second example, the used due was Rhodamine 6G (C28H31N2O3C1), also in an amount of 0.4 mg-eq./100 g of bentonite (10 g of a 1% dye solution in alcohol per 1 kg of 5% bentonite suspension). When this dye was used, the bentonite clay was colored in pink.

The invention claimed is:

1. A method for quantitative analysis of a distribution of suspension solid particles invaded in a porous medium during filtration, the method comprising:
   coloring solid particles with a cationic dye and preparing at least three calibration standards having different known mass concentrations of the colored solid particles by mixing the colored solid particles with grains of a granular medium, said grains having a color similar to a color of the studied porous medium;
   photographing the prepared calibration standards and obtaining color images of all calibration standards;
   carrying out a digital analysis of the obtained images of the calibration standards based on an additive RGB color model and obtaining intensity distribution profiles of red, green and blue colors in each calibration standard;
   selecting a single norm function for quantitative characterization of variations of red, green and blue colors in all calibration standards based on an analysis of the obtained intensity distribution profiles of red, green and blue colors in the calibration standards;

obtaining a single calibration curve by comparing the selected norm function with a known mass concentration of the colored particles in each calibration standard;

preparing a suspension with the colored solid particles and injecting the suspension through a studied porous medium sample;

after the injection of the prepared suspension of the colored solid particles dividing the porous medium sample into two parts along a suspension flow direction, photographing a sample split under the same conditions under which the images of the calibration standards were obtained, and obtaining an image of the split of the porous medium sample;

carrying out a digital analysis of the split of the porous medium sample based on the additive RGB color model and obtaining a two-dimensional intensity distribution of red, green and blue colors in the sample split;

determining reference intensities of red, green and blue colors, determining a two-dimensional distribution of mass concentration of the colored solid particles based on the obtained two-dimensional intensity distribution of red, green and blue colors in the obtained image of the sample split and using the determined reference intensities of red, green and blue colors, the selected norm function and the calibration curve.

2. The method of claim 1, wherein all images of all the standards are located on the same photograph.

3. The method of claim 1, wherein the images of the standards are located in different photographs obtained under the same conditions.

4. The method of claim 1, wherein the porous medium sample is a rock core, and the suspension is a drilling fluid.

5. The method of claim 1, wherein the reference intensities of red, green and blue colors are determined by a sample split image area where the penetrated suspension solid particles are absent.

6. The method of claim 1, wherein for determining the reference intensities of red, green and blue colors the split of the porous medium sample is combined with at least one split of another similar sample that does not contain penetrated suspension solid particles and is additionally photographed, and the reference intensities of red, green and blue colors are determined by the obtained image area that does not contain penetrated suspension particles.

7. The method of claim 1, wherein a two-dimensional distribution of a porous medium volume portion occupied by the suspension solid particles is calculated based on the obtained two-dimensional distribution of the mass concentration of the suspension solid particles in the sample split, according to the formula:

$$\sigma = (1-\varphi)\frac{\rho_{skel}}{\rho_s}C_s$$

where $\sigma$ is a porous medium volume portion occupied by the suspension solid particles, $C_s$ is the mass concentration of the suspension solid particles in the porous medium, $\rho_s$ is a density of a material of the suspension solid particles, $\rho_{skel}$ is a density of a material matrix of the porous medium, $\varphi$ is a porosity.

8. The method to claim 7, wherein based on two-dimensional distribution of the porous medium volume portion occupied by the solid particles, a profile of the porous medium volume portion occupied by the suspension solid particles is determined by spatial averaging in a direction perpendicular to the flow direction of the suspension during injection.

9. The method of claim 7, wherein a two-dimensional distribution of the porous medium volume portion occupied by a package of the suspension solid particles is further calculated based on the obtained two-dimensional distribution of the porous medium volume portion occupied by the suspension solid particles, according to the formula:

$$\sigma_{fc} = \frac{\sigma}{1-\varphi_{fc}}$$

where $\sigma_{fc}$ is the porous medium volume portion occupied by the package of the suspension particles, $\varphi_{fc}$ is an inherent porosity of the package of the suspension solid particles.

10. The method of claim 9, wherein based on the obtained two-dimensional distribution of the porous medium volume portion occupied by the package of the suspension solid particles, a profile of the porous medium volume portion occupied by the package of the suspension solids is further calculated by spatial averaging in the direction perpendicular to the flow direction of the suspension during injection.

11. The method of claim 1, wherein based on the obtained two-dimensional intensity distribution of red, green and blue colors in the sample split, intensity profiles of red, green and blue colors are determined along the sample split by spatial averaging in the direction perpendicular to the flow direction of the suspension during injection.

12. The method of claim 1, wherein based on the obtained two-dimensional distribution of the mass concentration of the colored suspension solid particles, profiles of the mass concentration of the suspension solid particles are determined along the sample split by spatial averaging in the direction perpendicular to the flow direction of the suspension during injection.

13. The method of claim 11, wherein empirical parameters describing a capture of particles in the porous medium are determined by achieving the best correspondence between the profile of the porous medium volume portion occupied by the solid particles, the profile being obtained by solving (analytically or numerically) an appropriate mathematical model of a filtration process of the suspension, and the profile determined based on the digital analysis of the image of the sample split.

14. The method of claim 13, wherein during injection of the suspension of the colored particles through the sample, a pressure drop along the sample and a flow rate of the injected suspension are measured, and a type of dependence between the porous medium permeability and the porous medium volume portion occupied by the suspension solid particles is determined based on the obtained empirical parameters describing the capture of particles in the porous medium by achieving the best correspondence between the pressure drop and the flow rate of the injected suspension, which were obtained by solving (analytically or numerically) an appropriate mathematical model of the filtration process of the suspension, and experimentally measured values.

15. The method of claim 14, wherein the obtained empirical parameters describing the capture of particles in the porous medium, and the type of dependency between the porous medium permeability and the porous medium volume portion occupied by the suspension solid particles are used to determine parameters of an internal filter cake and to predict a change in the properties of a near-wellbore area, the change being caused by penetrated components of the drilling fluid.

16. The method of claim 11, wherein during injection of the suspension of the colored particles through the sample, a pressure drop along the sample and a flow rate of the injected suspension are measured, and empirical parameters describing a capture of the particles in the porous medium and a type of dependence between porous medium permeability and the porous medium portion volume occupied by the suspension particles are determined by achieving the best correspondence simultaneously between the pressure drop and the flow rate of the injected suspension, which are obtained by solving (analytically or numerically) an appropriate mathematical model of a filtration process of the suspension, and experimentally measured values, and between the profile of the porous medium volume portion occupied by the solid particles, the profile is being obtained by solving (analytically or numerically) an appropriate mathematical model of the filtration process of the suspension particles, and the profile determined based on the digital analysis of the image of the sample split.

17. The method of claim 16, wherein the obtained parameters describing the capture of the particles in the porous medium, and the type of dependence between the porous medium permeability and the porous medium volume portion occupied by the suspension solid particles are used to determine parameters of an internal filter cake and to predict a change in the properties of a near-wellbore area, the change being caused by penetrated components of the drilling fluid.

18. The method of claim 1, wherein after injection of the suspension of the colored particles into the porous medium sample, the sample is dried to a complete removal of pore water, and a two-dimensional distribution of the porous medium volume portion occupied by the suspension particles is calculated based on the obtained two-dimensional distribution of the mass concentration of the suspension particle in the sample split, according to the formula:

$$\sigma = \gamma(1-\varphi)\frac{\rho_{skel}}{\rho_s}C_s$$

where $\sigma$ is the porous medium volume portion occupied by the suspension solid particles, $C_s$ is the mass concentration of the suspension particles in the porous medium, $\rho_s$ is a density of a material of the suspension particles, $\rho_{skel}$ is a density of a material matrix of the porous medium and, $\varphi$ is a porosity, $\gamma$ is a swelling factor.

19. The method of claim 18, wherein a two-dimensional distribution of the porous medium volume portion occupied by a package of the suspension solid particles is further calculated based on the obtained two-dimensional distribution of the porous medium volume portion occupied by the suspension solid particles, according to the formula:

$$\sigma_{fc} = \frac{\sigma}{1-\varphi_{fc}}$$

where $\sigma_{fc}$ is the porous medium volume portion occupied by the package of the suspension particles, $\varphi_{fc}$ is an inherent porosity of the package of the suspension solid particles.

20. The method of claim 18, wherein based on the obtained two-dimensional distribution of the porous medium volume portion occupied by the solid particles, a profile of the porous medium volume portion occupied by the suspension solids is further calculated by spatial averaging in the direction perpendicular to the flow direction of the suspension during injection.

21. The method of claim 19, wherein based on the obtained two-dimensional distribution of the porous medium volume portion occupied by the package of the suspension solid particles, a profile of the porous medium volume portion occupied by the package of suspension solids is further calculated by spatial averaging in the direction perpendicular to the flow direction of the suspension during injection.

22. The method of claim 20, wherein empirical parameters describing a capture of the particles in the porous medium are further determined by achieving the best correspondence between the profile of the porous medium volume portion occupied by the solid particles, the profile being obtained by solving (analytically or numerically) an appropriate mathematical model of a filtration process of the suspension, and the profile determined based on the digital analysis of the image of the sample split.

23. The method of claim 22, wherein during injection of the suspension of the colored particles through the sample, a pressure drop along the sample and a flow rate of the injected suspension are measured, and a type of dependence between the porous medium permeability and the porous medium portion volume occupied by the suspension particle are determined based on the obtained empirical parameters describing the capture of the particles in the porous medium by achieving the best correspondence between the pressure drop and the flow rate of the injected suspension, which are obtained by solving (analytically or numerically) an appropriate mathematical model of the filtration process of the suspension, and experimentally measured values.

24. The method of claim 23, wherein the obtained parameters describing the capture of the particles in the porous medium, and the type of dependence between the porous medium permeability and the porous medium volume portion occupied by the suspension particles are used to determine parameters of an internal filter cake and to predict a change in the properties of a near-wellbore area, the change being caused by penetrated components of the drilling fluid.

25. The method of claim 20, wherein during injection of the suspension of the colored particles through the sample, a pressure drop along the sample and a flow rate of the injected suspension are measured, and empirical parameters describing a capture of the particles in the porous medium and a type of dependence between the porous medium permeability and the porous medium portion volume occupied by the suspension particles are determined by achieving the best correspondence simultaneously between the pressure drop and the flow rate of the injected suspension, which are obtained by solving (analytically or numerically) an appropriate mathematical model of a filtration process of the suspension, and experimentally measured values, and between the profile of the porous medium volume portion occupied by the solid particles, the profile is being obtained by solving (analytically or numerically) an appropriate mathematical model of the filtration process of the suspension particles, and the profile determined based on the digital analysis of the image of the sample split.

26. The method of claim 25, wherein the obtained parameters describing the capture of the particles in the porous medium, and the type of dependence between the porous medium permeability and the porous medium volume portion occupied by the suspension particles are used to determine parameters of an internal filter cake and to predict a change in the properties of a near-wellbore area, the change being caused by penetrated components of the drilling fluid.

* * * * *